United States Patent [19]
Berezowski et al.

[11] 4,423,317
[45] Dec. 27, 1983

[54] MICRO CARD READER

[75] Inventors: Jaroslaw Berezowski, Greenwich, Conn.; Harvey M. Feinman, Bronx, N.Y.

[73] Assignee: Sealectro Corporation, Mamaroneck, N.Y.

[21] Appl. No.: 305,116

[22] Filed: Sep. 24, 1981

[51] Int. Cl.³ .............................................. G06K 7/10
[52] U.S. Cl. .................................. 235/458; 235/474; 235/489; 235/482
[58] Field of Search ................ 235/458, 474, 482, 489

[56] References Cited

U.S. PATENT DOCUMENTS

| 3,973,107 | 8/1976 | Walter | 235/474 |
| 4,055,747 | 10/1977 | Jenson | 235/458 |
| 4,118,028 | 9/1978 | Baio et al. | 235/458 |
| 4,130,756 | 12/1978 | Arndt et al. | 235/474 |
| 4,184,632 | 1/1980 | Moss | 235/458 |

FOREIGN PATENT DOCUMENTS 7819172 2/1980 France ................................ 235/485

Primary Examiner—G. Z. Rubinson
Assistant Examiner—Robert Lev
Attorney, Agent, or Firm—Hedman, Casella, Gibson, Costigan and Hoare

[57] ABSTRACT

A new and improved micro card reader includes a unitary molded base member having a planar rectangular slot therein for slidably receiving a punched data card of standard credit card size having a plurality of columns and rows. Along one edge of the base member is a plurality of registering depressions disposed in the outer facing side of the base member which are adapted to receive optical components. The registering depressions also include registering data sensing apertures therethrough, the number and spacing of the apertures correspond to the number and spacing of the data rows in the data card. Adjacent to one face of the base member is a plurality of light sources disposed within the depressions and aligned with the registering apertures therein. Adjacent to the other face of the base member is a plurality of light sensors which are also aligned with the registering apertures of the base member. As the data card is inserted into the reader the punched holes of the card create a signal received by the row of light sensors. The data card includes one completely punched row which forms an integral strobe channel within the data card which generates intermittent signal for identifying the column of data being read. The combination of signals provides the correct data input.

7 Claims, 5 Drawing Figures

MICRO CARD READER

BACKGROUND OF THE INVENTION

The subject invention relates to punched card readers and more particularly to a micro card reader for optically reading data punched in a badge which is the size of a standard credit card for application in smaller reader systems than presently available systems.

Generally optical card readers transform the punched holes in data cards into electrical impulses by means of photoelectric cells which are activated as the punched card passes over a light source. The generated signals are then carried by well known circuitry to a read out or terminal device.

One exemplary optical card reader is described in U.S. Pat. No. 4,114,028 which issued to Alfred R. Baio and David L. Genovese on Sept. 12, 1978 and is assigned to the assignee of the present invention. The card reader described therein includes a base member for slidably receiving a punched data card having a plurality of columns and rows. The punched holes each are located at an intersection of a column and a row such that each punched hole or data point has a row component and a column component. Along one edge of the base member is a row of apertures corresponding in number and spacing to the rows on the data card. The base member further includes a centrally located strobe aperture. A strobe generator is slidably mounted on one face of the base member. The strobe generator includes a central column of slots disposed perpendicular to the row of apertures on the base member and disposed so as to pass over the strobe aperture as the inserted data card displaces the strobe generator away from the row of apertures in the base member. The slots correspond in number and in spacing to the row on the data card. Adjacent to one face of the base member are a plurality of light sources aligned with the row of apertures and the centrally located strobe aperture. Adjacent to the other face of the base member are a plurality of light sensors aligned with the row of apertures and the central strobe aperture of the base member.

In operation, as a punched card is inserted into the reader, the columns of the card will pass over the row of apertures of the base member. Where a punched hole exists a light signal will be transmitted from an LED, through an aperture of the base member and will be received by a phototransistor aligned therewith. Simultaneously, the card being inserted displaces the strobe generator causing its slots to pass over the strobe aperture and the LED aligned therewith creating a series of intermittent light signals which correspond in number and spacing to the columns of the data card. As a result, for each data point on the punched card its row component is sensed by the light signal from the row of apertures on the base member, while simultaneously its column component is sensed by the signal created by the strobe generator. The combination of signals provides the correct data input. Thus, the card reader internally scans and discriminates data, and does so very simply by mechanical means. The reader also includes means for detecting the correct position and orientation of a card as well as the last readable position on the card.

The intelligence contained in the card may be read by a terminal or readout device which may be programmed to discriminate and accept certain data. If acceptable data has been supplied, the terminal device may then send an actuating electrical impulse to a related system designed to perform some desired function. One particularly desirable characteristic of the system is that data may be punched in cards with relative ease. Further, a change in the programming of the terminal device to accept many or different data inputs is easily accomplished. The card reader is accurate and the data cards specific so that the card reader is particularly well suited for use in security systems. For example, the data punched in the card may serve as a code or combination for a lock mechanism. A card reader system provides a distinct advantage over earlier tumbler lock and key devices in that in the earlier systems in the event of unauthorized possession of a key, or combination, the entire lock had to be replaced. With a card reader system only the code needs to be changed. Accordingly, it has become desirable to install card readers for many different business uses and frequently in smaller environments, as for example in hotel room doors or safe deposit boxes. Earlier card readers tend to be too large for these applications. Further, the cards themselves are large so that they are inconvenient to carry.

Accordingly, it is an object of the subject invention to provide a micro card reader which may be fitted into smaller environments to extend the purposes and situations for which such devices may find application.

It is another object of the subject invention to provide a micro card reader capable of reading a smaller punched data card which may be conveniently carried by the user in a wallet, pocket, or other carrier.

It is a further object of the subject invention to provide a micro card reader having fewer parts for greater reliability and economy of manufacture.

SUMMARY OF THE INVENTION

In accordance with these and many other objects, the subject invention provides a new and improved micro card reader for reading punched data cards. The micro card reader is designed to read a card or badge of standard credit card size including a data field defined by a plurality of rows and columns which extend from one end of the card to a point intermediate the length thereof. Data is punched into the card in the form of standard Hollerith holes such that the long dimension of each hole lies parallel to the short dimension of the card. With data being arranged in this manner, a data field including seven rows is provided and the micro card reader may be designed to read a field containing up to fourteen columns. One row of the data field is completely punched to provide a strobe generating channel within the badge itself. The card is partially inserted into the micro card reader longitudinally, data field end first, for deciphering the intelligence contained within the card.

The new and improved micro card reader of the subject invention is comprised of an assembly of components and includes a molded unitary base member having a rectangular slot therein for closely and slidably receiving the punched data card. The base member is formed such that an upper and a lower plate extend along the upper and lower respective sides of the slot. Seven sets of registering depressions are disposed within the respective outer facing sides of the upper and lower plates adjacent one edge of the base member. Six of the seven sets are of approximately the same size and each of the six sets further includes a set of registering apertures extending through the upper plate and the lower plate respectively. These six sets of registering apertures correspond in number and in spacing to the six data containing rows within the punched data card so as to form an aligned row of data sensing apertures. The seventh set of registering depressions may also include a set of registering apertures dedicated to sensing the strobe signal generated by the seventh fully punched row or strobe channel in the punched data card. In a preferred embodiment however, the seventh set of registering depressions is larger than the other six and includes two sets of registering apertures therein which are offset and disposed on either side of the aligned row of data sensing apertures to provide a positive to negative transition signal upon insertion and withdrawal of the punched data card respectively.

Mounted on the outer facing side of the lower plate of the base member is a first printed circuitboard which includes a row of spaced light sources, typically light emitting diodes (LED's) which are aligned with and extend within the row of depressions in the lower plate of the base member. The board also includes circuitry for connecting the first circuitboard to a power source and readout device.

Mounted on the outer facing side of the upper plate of the base member is a second printed circuit board which includes a row of spaced light sensors, typically phototransistors which are aligned with and extend within the depressions in the upper plate of the base member. This second printed circuit board also includes circuitry for connecting the board to a power source and readout device.

The subject reader further includes means for detecting the end of the data card to indicate when full insertion of the data field has been achieved. Typically, said means comprises further apertures, light sources and light sensors disposed such that appropriate signals may be transmitted to the readout device. In a preferred embodiment a mechanical switch is added at an edge of the base member such that the switch is activated or tripped by full insertion of the data card. The assembly is placed within a housing to protect the electrical components from external shock.

In operation, as a punch card is inserted into the reader the columns in the card pass between the rows of registering apertures within the upper and lower plates of the base member. When a punched hole in the card is aligned with the registered apertures, a light signal will be transmitted from an LED through the data sensing apertures in the base member to be received by the phototransistor aligned therewith. As the card is inserted, the strobe channel passes between the strobe sensing apertures creating a series of intermittent light signals corresponding in number and spacing to the columns of the data card. As a result, the row component of each data point on the punched card will be sensed by the light signal from the row of data sensing apertures within the base member, while simultaneously its column component will be sensed from the signal created by the strobe channel as it passes over the strobe sensing apertures. Thus the new and improved micro card reader of the subject invention internally scans and discriminates data by optical means with data being read column serial and row parallel.

Further objects and advantages of the subject invention will become apparent from the following detailed description in conjunction with the drawings.

DETAILED DESCRIPTION OF THE PREFERRED EMBODIMENT

Figure 1:
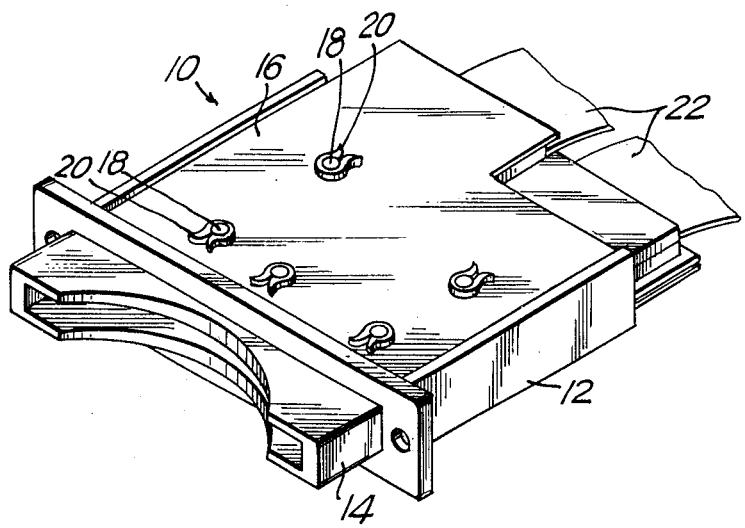
FIG. 1 is a perspective view of the new and improved micro card reader of the subject invention in its assembled form.

Referring to FIG. 1, the new and improved micro card reader of the subject invention is generally designated by the numeral 10, and is shown in its assembled form. Micro card reader 10 includes a base member 12 having a card feed-in slot 14 extending from one edge thereof. In the preferred embodiment depicted herein micro card reader 10 includes a top cover plate 16 which encloses and protects the internal components of the micro card reader 10. A plurality of locating pins 18 extend from base member 12 through openings in the top cover plate 16. Top cover plate 16 is secured to base member 12 by a plurality of grip rings 20 which are disposed at the distal end of each locating pin 18. A pair of flat conductor cables 22 extend from base member 12 from the end opposite card feed-in slot 14, and are operative to connect the internal electrical components of micro card reader 10 to a power source and a readout device.

Figure 2:
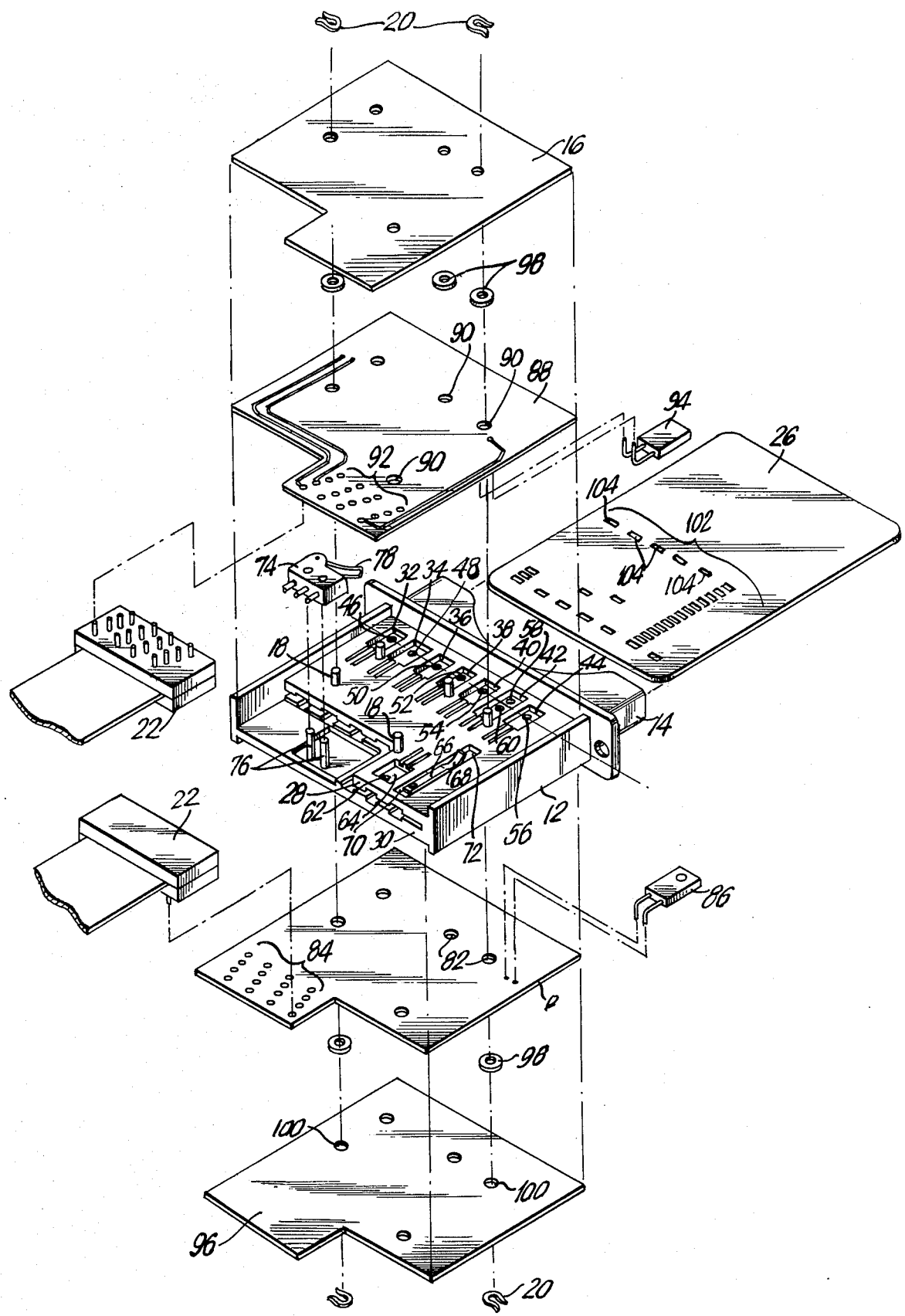
FIG. 2 is an exploded perspective view of the components of the new and improved micro card reader of the subject invention.

Micro card reader 10 is comprised of an assembly of components as depicted in FIG. 2. As shown therein, the base member 12 is of generally rectangular configuration and is preferably formed of a unitary piece of molded plastic. Base member 12 includes a planar rectangular slot 24 extending therethrough for closely and slidably receiving a punched data card 26. Rectangular slot 24 divides base member 12 in such manner as to form an upper plate 28 and a lower plate 30 (see FIG. 3). Upper plate 28 includes a plurality of rectangular depressions 32–44 within its outer facing side disposed adjacent card feed-in member 16. Depressions 32, 34, 36, 38, 40 and 44 each contain a centrally located data sensing aperture extending through upper plate 28 with apertures being numbered 46–56 respectively. The data sensing apertures 46–56 are aligned to form a row.

In the preferred embodiment depicted in FIG. 2, depression 42 is larger than the other depressions and includes two apertures 58 and 60 which are offset from the aligned row of data sensing apertures 46–56 with apertures 58 and 60 being disposed on opposite sides thereof. Apertures 58 and 60 are strobe sensing apertures and each is offset to provide a positive to negative transition signal upon insertion and removal respectively of the data card 26 in a manner more fully described hereinafter.

Upper plate 28 also includes the plurality of locating pins 18 extending from the outer facing side thereof. An end-of-card sensing aperture 62 is disposed adjacent the opposed edge of upper plate 28 within a rectangular depression 64. A card retaining spring 66 having a curved card retainer portion 68 is countersunk within upper plate 28 in an elongated rectangular depression 70. A portion 72 of elongated depression 68 is cut away in a manner permitting the curved retainer portion 68 of retaining spring 66 to extend partially within slot 24 to retain inserted data card 26.

Figure 4:
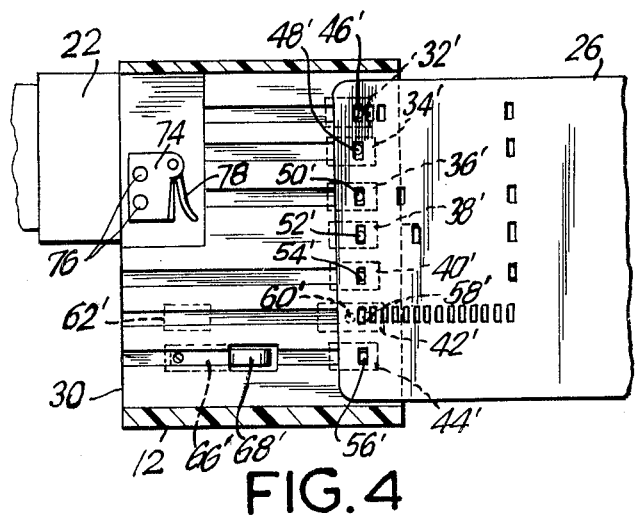
FIG. 4 is a cross-sectional top plan view of the base member of the new and improved micro card reader of the subject invention as a card is initially inserted into the reader.
Figure 5:
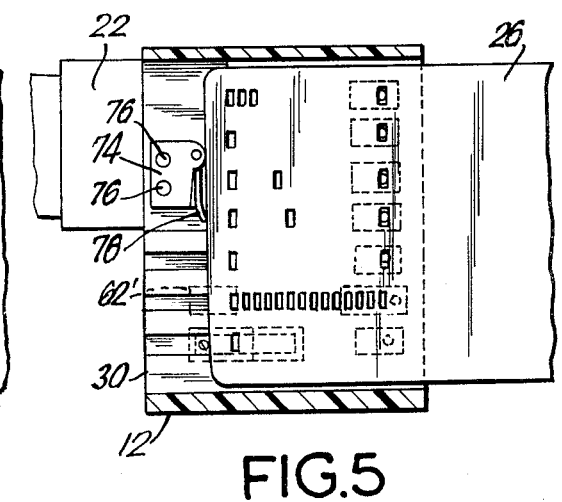
FIG. 5 is a cross-sectional top plan view of the base member of the new and improved micro card reader of the subject invention as shown in FIG. 4 and illustrating the position of the punched card after it is fully inserted into the reader.

The lower plate 30 of base member 12 is a mirror image of upper plate 28. As shown in FIGS. 4 and 5, lower plate 30 includes a plurality of depressions which are the compliment of those in upper plate 28 and are disposed in register therewith, numbered 32'-44' respectively. Each of the complimentary depressions 32', 34', 36', 38', 40' and 44' likewise includes the complimentary data sensing apertures 45'-56' respectively which are disposed in register with apertures 45-56 in upper plate 28. Similarly, an end of card sensing aperture 62' within a depression 64' is disposed within lower plate 30 in register with aperture 62 and depression 64 of upper plate 28. A complimentary card retaining spring 66' is disposed to cooperate with retaining spring 66 in upper plate 28 to retain the punched card 26 within slot 24. In addition the outer facing side of lower plate 30 includes a plurality of locating pins 18' (not shown) extending therefrom which are aligned with locating pins 18 extending from upper plate 28.

In the preferred embodiment depicted in FIG. 2 a portion of upper plate 28 is cut away to provide for the mounting of mechanical switch 74 on a pair of mounting posts 76 which extend upwardly from the inner facing side of lower plate 30. Mechanical switch 74 includes a trip lever 78 which may be actuated upon insertion of data card 26 to provide an additional end-of-card sensing verification.

Micro card reader 10 further includes a first printed circuit board 80 disposed adjacent the outer facing side of lower plate 30. First printed circuit board 80 includes a plurality of openings 82 through which locating pins 18' extend. Printed circuit board 10 further includes receptacle 84 for receiving the connector cables 22 therein electrically connecting first circuit board 80 to a power source and readout device.

Figure 3:
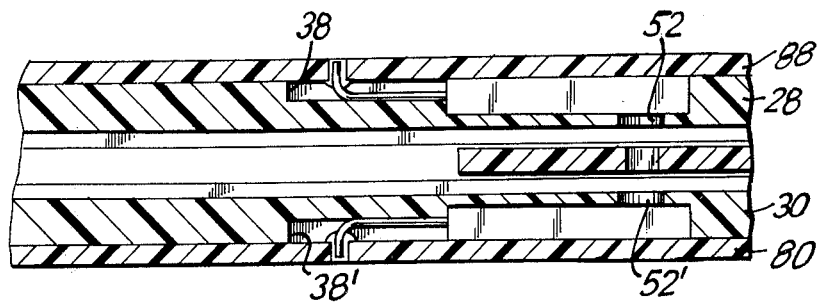
FIG. 3 is an elevational, cross-sectional side view of the operative components of the new and improved micro card reader.

Mounted on first printed circuit board 80 are a plurality of light sources 86. The number of light sources 86 corresponds to the number of apertures within the lower plate 30, namely nine, including the six data sensing apertures 46'-56', the two offset strobe sensing apertures 58' and 60', and the end of card sensing aperture 62'. Each light source 86 is mounted to first circuit board 80 in such manner that it extends within one of the rectangular depressions 32'-44' and 64' within lower plate 30, with the beam of light transmitted therefrom being directed through the respective sets of registering apertures within base member 12 as shown in FIG. 3. The light sources 86 are preferably lensed infra red light emitting diodes. The lenses on the diodes are operative to focus the light emitted therefrom into a narrow beam to reduce the possibility of any cross-talk between adjacent data rows during the reading of the data card 26.

Micro card reader 10 further includes a second printed circuit board 88 disposed adjacent the outer facing side of upper plate 28. Second printed circuit board 88 also includes a plurality of openings 90 disposed such that the locating pins 18 extending from upper plate 28 extend therethrough. A receptacle 92 for receiving connector cable 22 extends from one end thereof for connecting second circuit board 88 to a power source and a readout device.

A plurality of phototransistors 94 are mounted to second printed circuit board 88 such that each phototransistor 94 extends within each rectangular depression in upper plate 28, and with each phototransistor 94 being aligned with each respective aperture therein. The phototransistors 94 are preferably also lensed to provide them with a narrow angle of acceptance which permits the card reader 10 to resolve the tight web of columns and rows in the data card 26.

Micro card reader 10 further includes a plurality of spacing washers 98 disposed at each of the opposed sides of the first printed circuit board 80 and second printed circuit board 88 respectively. Locating pins 18' and 18 extend through the interior openings in each of the washers 98. A bottom cover plate 96 having approximately the same configuration as that of first printed circuit board 80 includes a plurality of openings 100. Bottom cover plate 96 is disposed adjacent the spacing washers 98 such that locating pins 18' extend through openings 100. Bottom cover plate 96 protects the first circuit board 80 from external shock and also serves as a housing for containing the various elements of micro card reader 10 disposed at the underside of base member 12. Grip rings 20 are disposed at the distal end of locating pins 18' and are operative to secure bottom plate 96 to base member 12. Similarly, top cover plate 16 is of approximately the same configuration as second circuit board 88 and is disposed adjacent thereto with locating pins 18 extending through openings therein. As described above, with reference to FIG. 1, top cover plate 16 is also secured to base member 12 by means of grip rings 20.

The punched data card 26 for use with the micro card reader 10 of the subject invention is of a standard credit card size. A data field generally referred to by the number 102 extends from one end of card 26 to a point intermediate the length thereof. Data field 102 is defined by a plurality of rows and columns. Data is punched into card 26 in the form of standard hollerith holes 10 in such manner that the long dimension of each hole 104 lies parallel to the short dimension of the card 26. With the data being punched into the card 26 in this manner, data field 102 may include seven rows. One row of the data field is completely punched thereby providing a strobe generating channel which is an integral feature of the data card 26. The dimensions of the micro card reader are such that it is designed to read a data field containing up to 14 colummns.

In use, the punched data card 26 is partially inserted into the micro card reader 10 longitudinally, data field 102 end first, for deciphering the intelligence or data contained within the card 26. As illustrated in FIG. 2, punched data card 26 is introduced to micro card reader 10 through card feed-in member 14 which directs card 26 into slot 24 of the base member 12. As car 26 is inserted into slot 24 it passes between the row of data sensing apertures and strobe sensing apertures in the base member. The card interrupts the beam of light being transmitted by the infra red light emitting diodes 86 in the lower plate 30 to the phototransistors 94 disposed in the upper plate 28 in alignment therewith. Each row of data field 102 within card 26 is aligned with a row of apertures 32 through 36 within the base member. Where a punched hole exists, a light signal will be transmitted from an LED to the card and the apertures of the base member and will be received by the phototransistor aligned therewith. The phototransistor converts the light signal to an electric signal which can be read by a readout device.

Referring to FIG. 4, as card 26 is inserted within reader 10, offset strobe sensing aperture 58 will sense the first punch in the strobe channel within data card 26. A pulse of light will be transmitted to phototransistor 94 which is aligned with aperture 58. This pulse provides a column counter within the card reader. As the insertion of card 26 continues the first punch in the strobe channel will be disposed away from aperture 58 while a solid portion of the card representing the spacing between the first and second punches in the strobe channel will block transmission of the signal. Simultaneously therewith, column 1 of the six data containing rows within data field 102 will be in alignment with the row of data sensing apertures 32–44. If any data punches are located within column 1 in any of the rows in the data field, a signal will be generated to the phototransistors aligned therewith, thereby providing the row component for each data point. As card 26 is further inserted, column 1 will be displaced away from data sensing apertures 32–34 and simultaneously the second strobe punch within the strobe channel will generate a second signal through strobe sensing aperture 58 indicating the approach of column 2 of the data field for reading. Upon still further insertion, aperture 58 will be blocked by the spacing in the card between second and third strobe punches in the strobe channel at which time column 2 of the six data containing rows of the card will be in alignment with the data sensing apertures 32 through 44 for reading, and so on. The signal received by the readout device therefore includes a pulse generated by the strobe channel followed by a reading of the six data containing rows of the card during the blackout of the strobe, then a second pulse from the strobe channel followed by a blackout of the strobe at which time column 2 of the data field will be read. The offset position of strobe sensing aperture 58 therefore provides a positive to negative transition signal which is transmitted to the readout device for reading the data card. The data contained within the data field of the card is read row parallel and column serial. As card 26 is further inserted within the reader 10 the intermittent signals generated by the strobe channel continue with alternate intermittent reading of the various rows within the data field.

Referring to FIG. 5, when card 26 has been inserted up to the full 14 columns, the leading edge of data card 26 will block transmission of a light signal through aperture 62 at the rearward edge of the reader. A light signal is transmitted through end of card sensing aperture 62 during insertion and when card 26 blocks that signal the readout device registers that the card has been fully inserted and that 14 columns of data have been read. End of card sensing aperture 62 provides for reliable reading of data card 26 in that the various signals produced by insertion of card 26 will not be transmitted to readout device until the end of data card 26 has been sent indicating full insertion. More particularly, confused data readings may be produced by a partial insertion followed by a partial withdrawal and then reinsertion of the card. In such cases a plurality of strobe signals totaling 14 might be produced within the reader even though the entire data field has not been read. The subject card reader eliminates any such confused data reading by not transmitting any electrical information through the readout device until the end of the data card has been sensed indicating full insertion.

In addition, in the preferred embodiment shown in FIG. 5 a mechanical switch 74 is disposed within the base member which includes a trip lever 78 which is actuated to a closed position upon full insertion of the card. Actuation of trip lever 78 is operative to activate the LED and the phototransistor disposed at opposite sides of the strobe sensing aperture 60. Strobe sensing aperture 60 is also offset to provide a positive to negative transition for reading of the information contained in the data field upon withdrawal of the card. Thus, as described above, the data field 102 will be read backwards by the reader as the card is withdrawn. The results of this reverse scan may be compared to the results obtained upon insertion of the card within the readout device to provide a further verification and accuracy check for the micro card reader 10.

In summary, the subject invention provides a new and improved micro card reader of very simple construction and contained in a small compact package which is relatively inexpensive to manufacture. The optical means micro card reader employs an internal optical means for scanning and discriminating data are completely independent of any time basis. In addition, the micro card reader provides a series of simple validity checks thereby preventing false data readout.

Although the subject invention has been described in terms of a preferred embodiment it is apparent that various modifications and changes may be made therein by those skilled in the art without departing from the scope and spirit of the subject invention as defined in the appended claims.

What is claimed is:

1. An electro-optical card reader and data card said data card having a plurality of points disposed in columns and rows in the card with selected points allowing light to pass through the card, one said row defining a strobe channel with each of the points in said strobe channel allowing light to pass through said card, the points in the remaining rows defining data points for carrying selected data, said card reader comprising an assembly of components including:

a base member having a planar rectangular slot for slidably receiving the data card, said base member including first and second plates defining opposed sides of said slot, said first and second said plates each having a plurality of data sensing apertures and a strobe sensing aperture extending therethrough, with the data sensing apertures and the strobe sensing aperture in the first plate being in register respectively with the data sensing apertures and the strobe sensing aperture in the second plate to define registered sets of data sensing apertures and a registered set of strobe sensing apertures, said registered set of strobe sensing apertures being disposed in the card reader to be aligned with the strobe channel in the data card when the data card is inserted in the slot, the registered sets of data sensing apertures being disposed in the card reader to be aligned respectively with the rows of data points in the data card when the card is inserted in the slot;

signal generating means disposed within each said data and strobe sensing aperture in the first plate;

signal sensing means disposed with each said data and strobe sensing aperture in the second plate;

electrical data collection means in communication with each said signal generating means and each said signal sensing means, said electrical data collection means being operative to sequentially read each column of the data card, whereby when the card is positioned with the strobe channel aligned with the strobe apertures movement of the data card into or out of the slot in the card reader causes each point in the strobe channel to generate a strobe signal, each said strobe signal being operative to cause the reading of the data points in the respective column of the data card.

2. An electro-optical card reading assembly as in claim 1 wherein each said first and second plate includes an end of card sensing aperture extending therethrough, with the end of card sensing aperture in the first plate being in register with the end of card sensing aperture in the second plate, signal generating means disposed within the end of card sensing aperture in the first plate and signal sensing means being disposed within the end of card sensing aperture in the second plate, said end of card sensing apertures being disposed in said first and second plates at points thereon corresponding to complete insertion of the data card into the slot.

3. An electro-optical card reading assembly as in claim 1 wherein said registered sets of data sensing apertures are arranged in a line parallel to the columns of the data card when the data card is inserted in the slot, said registered set of strobe sensing apertures being offset from the line of the registered sets of data sensing apertures.

4. An electro-optical card reading assembly as in claim 3 wherein said registered set of strobe sensing apertures defines a first registered set of strobe sensing apertures, and wherein said first and second plates further includes a second registered set of strobe sensing apertures, said second registered set of strobe sensing apertures being provided with signal generating and signal sensing means, said second registered set of strobe sensing apertures being offset from the registered sets of data sensing apertures in a direction opposite to the offset of the first registered set of strobe sensing apertures.

5. An electro-optical card reading assembly as in claim 1 wherein said base member further includes a mechanical switch member for indicating complete insertion of the data card into the base member.

6. An electro-optical card reading assembly as in claim 1 wherein said signal generating means comprise a plurality of lensed infra red light emitting diodes.

7. An electro-optical card reading assembly as in claim 1 wherein said electrical sensing means comprise a plurality of lensed photo transistors having a narrow angle of acceptance.

* * * * *